(12) United States Patent
Matsumoto

(10) Patent No.: US 9,769,267 B2
(45) Date of Patent: Sep. 19, 2017

(54) MANAGING SYSTEM AND MANAGING METHOD

(71) Applicant: CANON KABUSHIKI KAISHA, Tokyo (JP)

(72) Inventor: Tetsuya Matsumoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 14/686,883

(22) Filed: Apr. 15, 2015

(65) Prior Publication Data

US 2015/0304434 A1 Oct. 22, 2015

(30) Foreign Application Priority Data

Apr. 16, 2014 (JP) ................................. 2014-084965

(51) Int. Cl.
*G06F 15/16* (2006.01)
*H04L 29/08* (2006.01)

(52) U.S. Cl.
CPC .......... *H04L 67/16* (2013.01); *H04L 67/1097* (2013.01)

(58) Field of Classification Search
CPC ............................ H04L 67/16; H04L 67/1097
USPC .................................................. 709/204, 223
See application file for complete search history.

(56) References Cited

U.S. PATENT DOCUMENTS

| 9,350,599 B1 | 5/2016 | Enright et al. |
| 2008/0080526 A1 | 4/2008 | Gounares et al. |
| 2011/0302133 A1* | 12/2011 | Kuruganti ......... G06F 17/30557 707/608 |
| 2013/0238641 A1 | 9/2013 | Mandelstein et al. |
| 2013/0254362 A1* | 9/2013 | Iwase .................. H04L 63/0218 709/223 |

(Continued)

FOREIGN PATENT DOCUMENTS

| JP | 2010-108170 A | 5/2010 |
| JP | 2013-196649 A | 9/2013 |

OTHER PUBLICATIONS

Kazunori Kato, U.S. Appl. No. 14/687,004, entitled: "Managing System and Managing Method", filed Apr. 15, 2015.

(Continued)

*Primary Examiner* — Philip B Tran
(74) *Attorney, Agent, or Firm* — Carter, DeLuca, Farrell & Schmidt, LLP

(57) ABSTRACT

Of a plurality of tenants that form a hierarchical structure, a first tenant that manages management information to be transferred between tenants and a second tenant to serve as a transfer destination are designated. Second management information, of the management information managed by the first tenant, that is shared with another tenant is specified in accordance with a sharing relationship for the second management information. Of the management information managed by the first tenant, third management information except for the specified second management information is transferred to the second tenant. The sharing relationship for the specified second management information is changed to a sharing relationship in which the second management information is shared between the second tenant and a tenant in a level above or below the second tenant in accordance with a new hierarchical structure formed after the transfer.

7 Claims, 19 Drawing Sheets

(56) References Cited

U.S. PATENT DOCUMENTS

2013/0326064 A1* 12/2013 Gulati .................. G06F 9/5061
709/226
2014/0211232 A1    7/2014 Ganesan et al.
2015/0213285 A1*  7/2015 Malko ................ G06F 21/6218
726/29

OTHER PUBLICATIONS

U.S. office action issued in corresponding U.S. Appl. No. 14/687,004 on Jan. 26, 2017.

* cited by examiner

FIG. 5

| SERVICE PROVIDER TENANT ID | SERVICE PROVIDER TENANT NAME |
|---|---|
| S000A | SERVICE PROVIDE A |
| S000B | SERVICE PROVIDE B |
| S000C | SERVICE PROVIDE C |
| S000D | SERVICE PROVIDE D |
| S000E | SERVICE PROVIDE E |
| S000X | SERVICE PROVIDE X |

FIG. 6A

| CUSTOMER TENANT ID | CUSTOMER TENANT NAME | LICENSING SERVICE PROVIDER TENANT ID |
|---|---|---|
| C0001 | CUSTOMER 1 | S000A |
| C0002 | CUSTOMER 2 | S000X |
| C0003 | CUSTOMER 3 | S000B |
| C0004 | CUSTOMER 4 | S000B |
| C0005 | CUSTOMER 5 | S000B |
| C0006 | CUSTOMER 6 | S000A |
| C0007 | CUSTOMER 7 | S000X |

FIG. 6B

| CUSTOMER TENANT ID | CUSTOMER TENANT NAME | LICENSING SERVICE PROVIDER TENANT ID |
|---|---|---|
| C0001 | CUSTOMER 1 | S000A |
| C0002 | CUSTOMER 2 | S000A |
| C0003 | CUSTOMER 3 | S000B |
| C0004 | CUSTOMER 4 | S000B |
| C0005 | CUSTOMER 5 | S000B |
| C0006 | CUSTOMER 6 | S000A |
| C0007 | CUSTOMER 7 | S000A |

FIG. 7A

| SERVICE PROVIDER TENANT ID | MANAGED CUSTOMER TENANT ID |
|---|---|
| S000A | C0001 |
| S000A | C0004 |
| S000A | C0005 |
| S000A | C0006 |
| S000A | C0007 |
| S000B | C0003 |
| S000B | C0004 |
| S000B | C0005 |
| S000C | C0003 |
| S000C | C0004 |
| S000C | C0005 |
| S000C | C0006 |
| S000C | C0007 |
| S000D | C0004 |
| S000D | C0005 |
| S000D | C0006 |
| S000D | C0007 |
| S000E | C0006 |
| S000E | C0007 |
| S000X | C0002 |
| S000X | C0003 |
| S000X | C0004 |
| S000X | C0005 |
| S000X | C0006 |
| S000X | C0007 |

FIG. 7B

| SERVICE PROVIDER TENANT ID | MANAGED CUSTOMER TENANT ID |
|---|---|
| S000A | C0001 |
| S000A | C0004 |
| S000A | C0005 |
| S000A | C0006 |
| S000A | C0007 |
| S000B | C0003 |
| S000B | C0004 |
| S000B | C0005 |
| S000C | C0003 |
| S000C | C0004 |
| S000C | C0005 |
| S000C | C0006 |
| S000C | C0007 |
| S000D | C0004 |
| S000D | C0005 |
| S000D | C0006 |
| S000D | C0007 |
| S000E | C0006 |
| S000E | C0007 |
| S000A | C0002 |
| S000A | C0003 |

| CUSTOMER TENANT ID (801) | SHARING SOURCE SERVICE PROVIDER TENANT ID (802) | SHARING DESTINATION SERVICE PROVIDER TENANT ID (803) | |
|---|---|---|---|
| C0003 | S000B | S000X | 804 |
| C0003 | S000X | S000C | 805 |
| C0004 | S000B | S000A | |
| C0004 | S000A | S000X | 806 |
| C0004 | S000A | S000C | |
| C0004 | S000X | S000D | 807 |
| C0005 | S000B | S000X | 808 |
| C0005 | S000X | S000A | 809 |
| C0005 | S000X | S000C | 810 |
| C0005 | S000A | S000D | |
| C0006 | S000A | S000C | |
| C0006 | S000C | S000X | 811 |
| C0006 | S000C | S000D | |
| C0006 | S000X | S000E | 812 |
| C0007 | S000X | S000C | 813 |
| C0007 | S000C | S000A | 814 |
| C0007 | S000C | S000D | |
| C0007 | S000A | S000E | 815 |

| CUSTOMER TENANT ID (801) | SHARING SOURCE SERVICE PROVIDER TENANT ID (802) | SHARING DESTINATION SERVICE PROVIDER TENANT ID (803) | |
|---|---|---|---|
| C0003 | S000B | S000A | 804 |
| C0003 | S000A | S000C | 805 |
| C0004 | S000B | S000A | |
| C0004 | S000A | S000C | |
| C0004 | S000A | S000D | 807 |
| C0005 | S000B | S000A | 808 |
| C0005 | S000A | S000C | 810 |
| C0005 | S000A | S000D | |
| C0006 | S000A | S000C | |
| C0006 | S000C | S000D | |
| C0006 | S000A | S000E | 812 |
| C0007 | S000A | S000C | 813 |
| C0007 | S000C | S000D | |
| C0007 | S000A | S000E | 815 |

FIG. 9

| CUSTOMER TENANT ID | SHARING SOURCE SERVICE PROVIDER TENANT ID | SHARING DESTINATION SERVICE PROVIDER TENANT ID | |
|---|---|---|---|
| C0003 | S000B | S000A | ~804 |
| C0003 | S000A | S000C | ~805 |
| C0004 | S000B | S000A | |
| C0004 | S000A | S000C | |
| C0004 | S000A | S000D | ~807 |
| C0005 | S000B | S000A | ~808 |
| C0005 | S000A | S000C | ~810 |
| C0005 | S000A | S000D | |
| C0006 | S000A | S000C | |
| C0006 | S000C | S000D | |
| C0006 | S000C | S000E | ~812 |
| C0007 | S000A | S000C | ~813 |
| C0007 | S000C | S000D | |
| C0007 | S000C | S000E | ~815 |

801, 802, 803

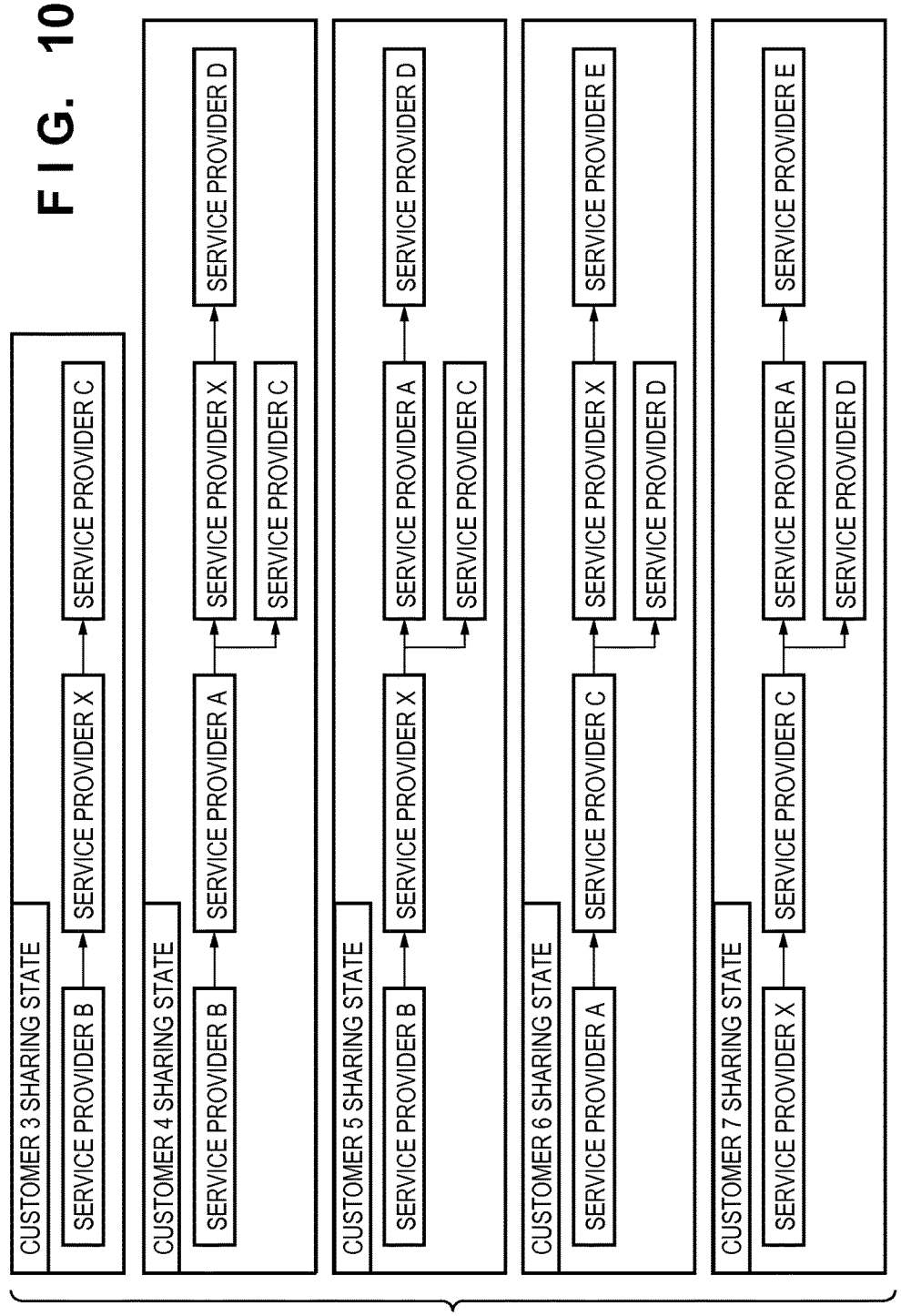

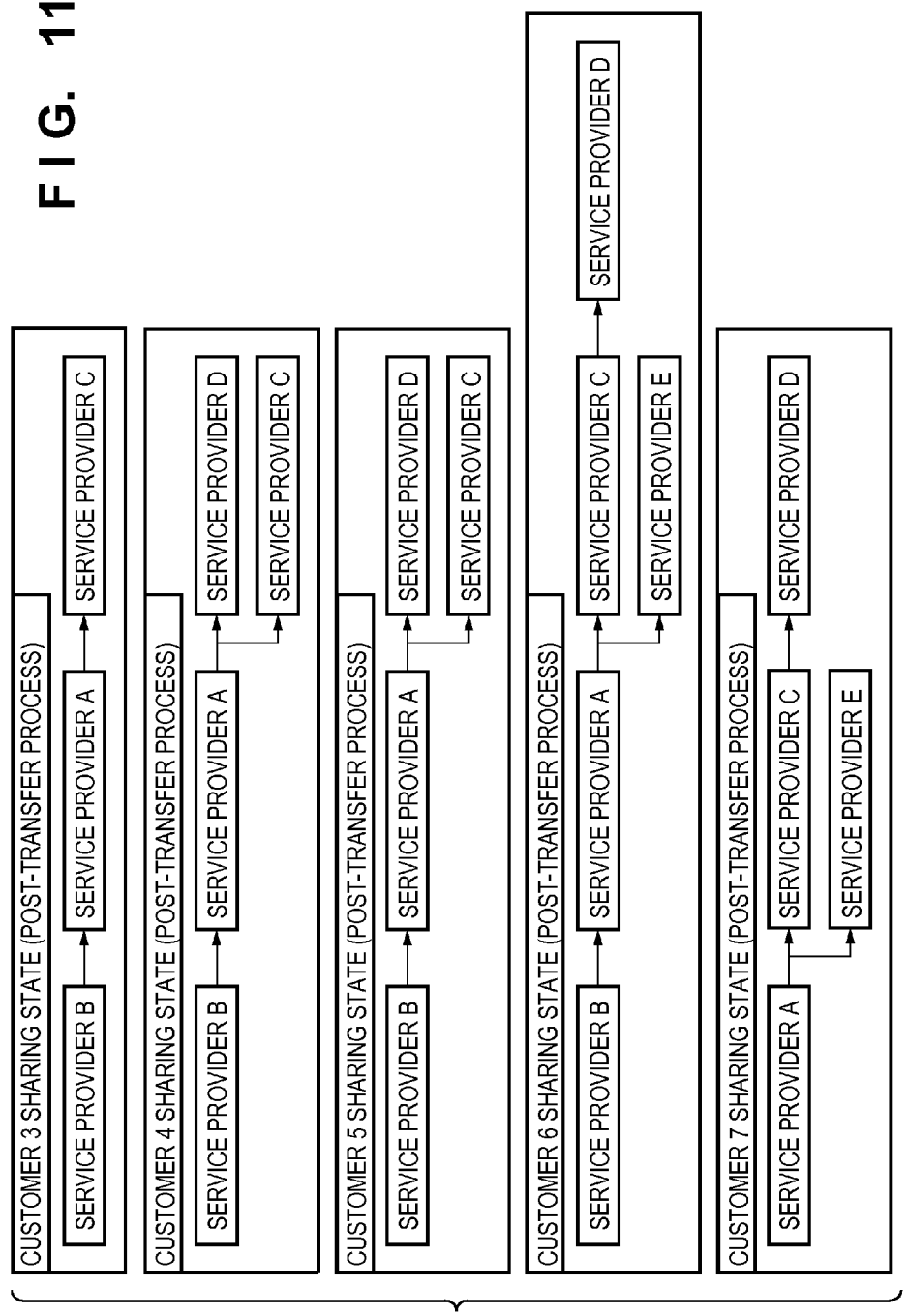

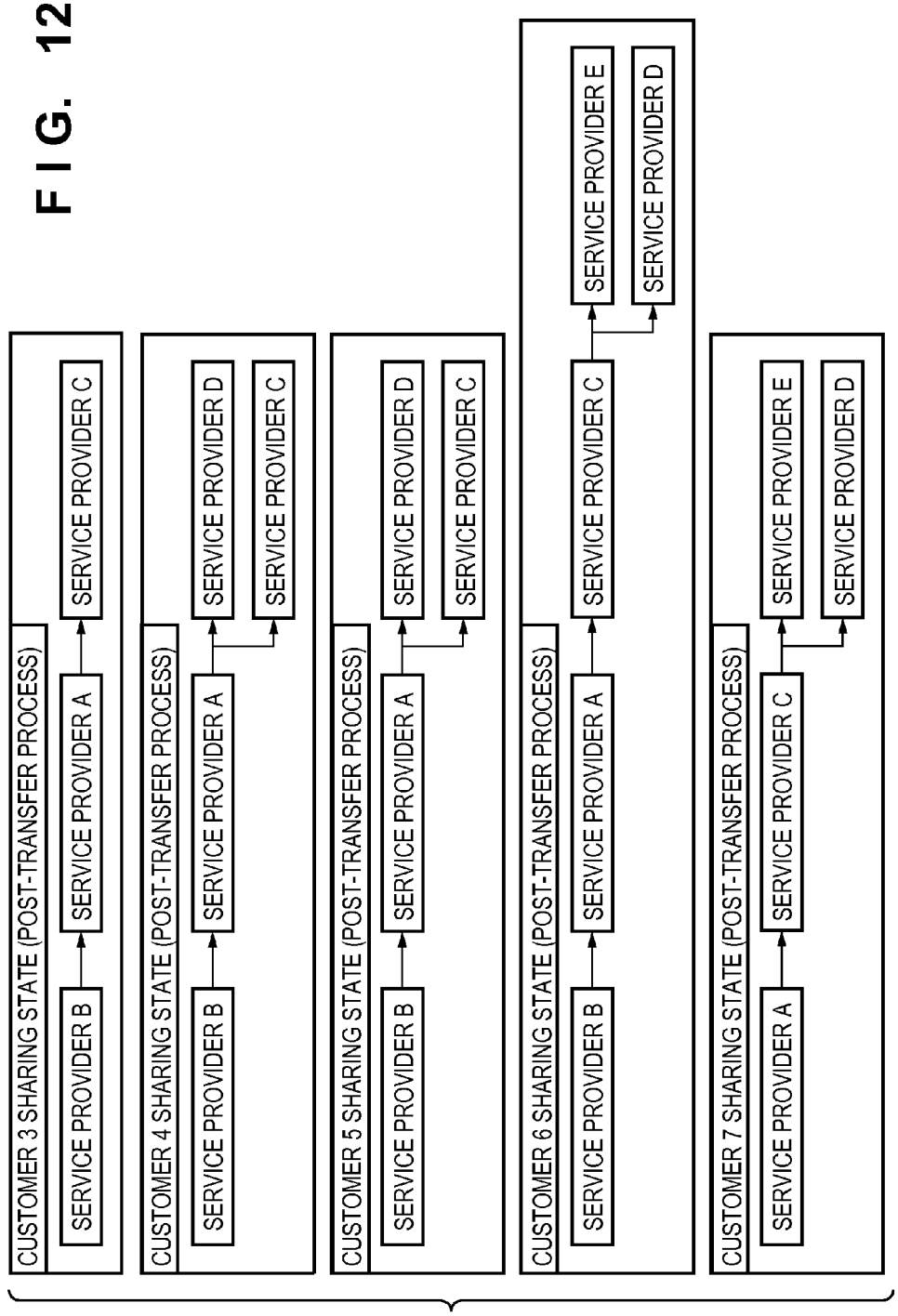

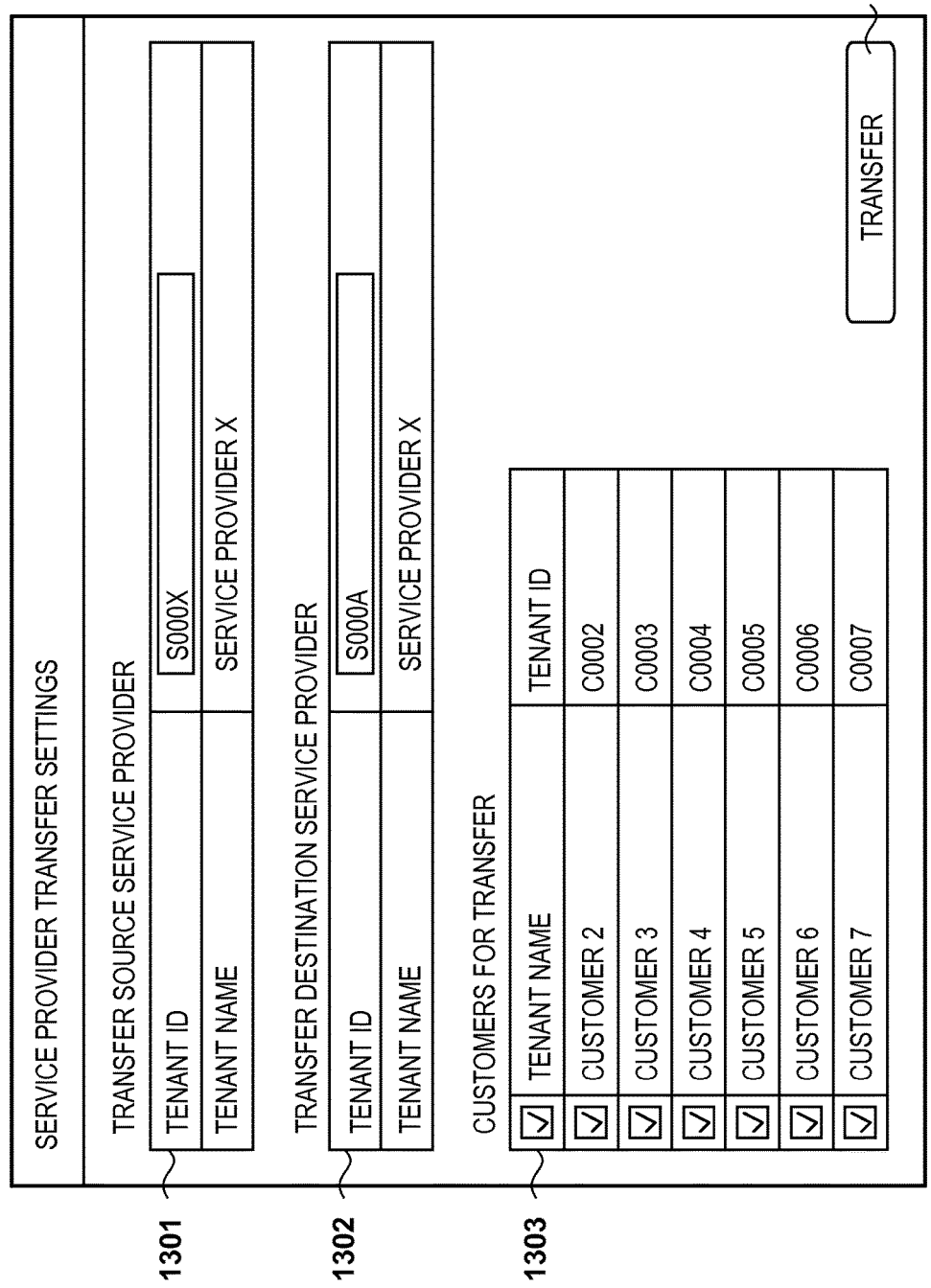

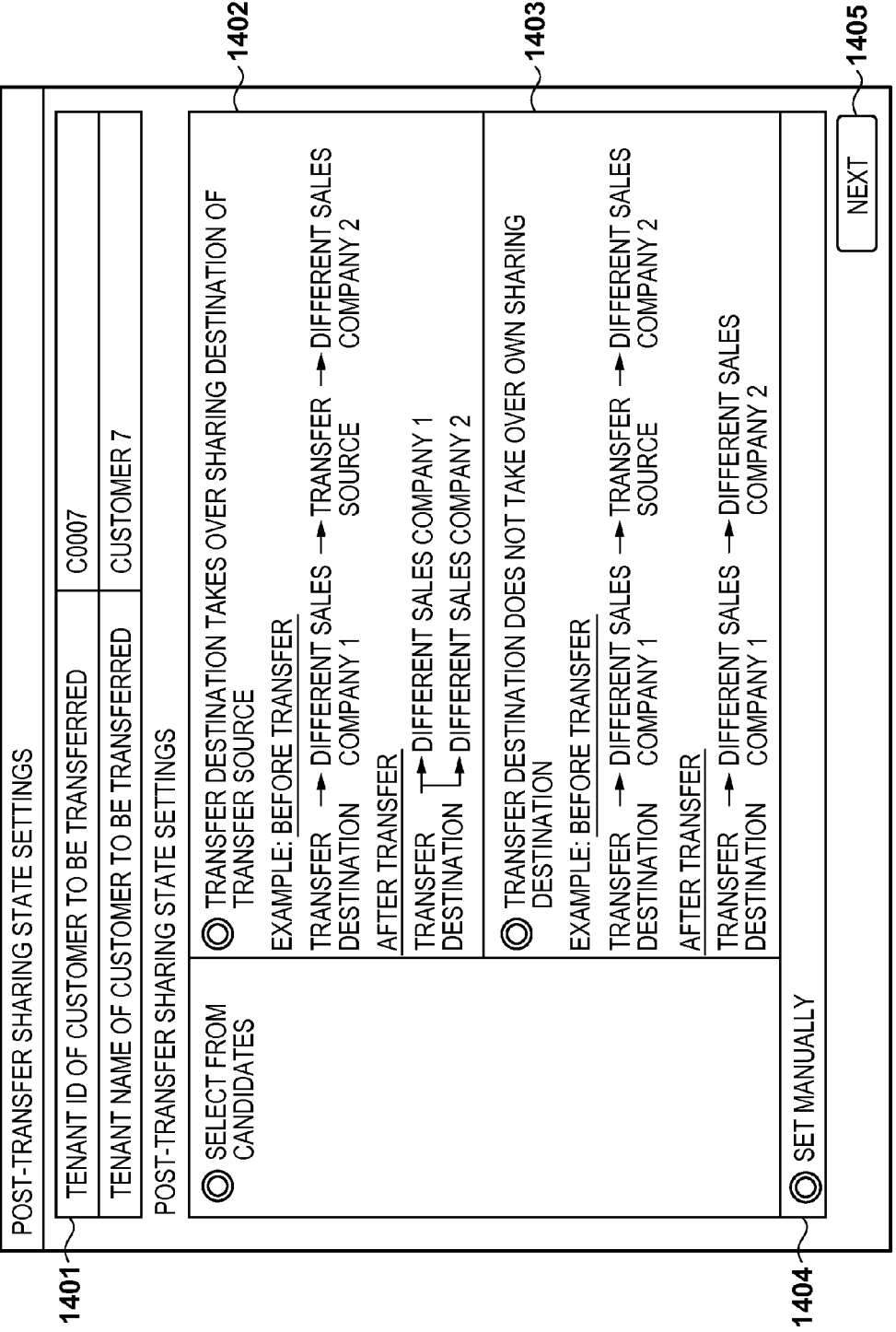

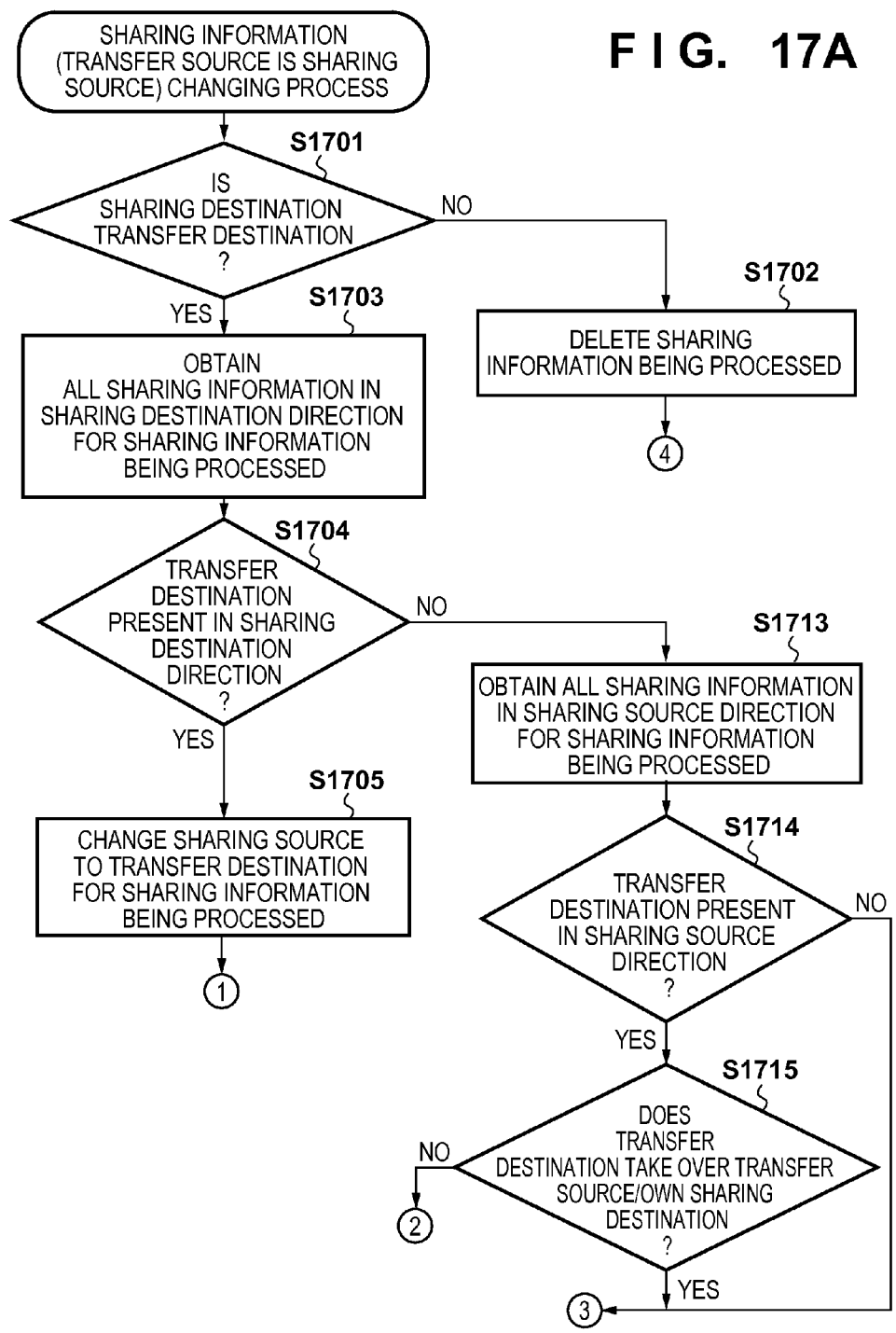
F I G. 17A

MANAGING SYSTEM AND MANAGING METHOD

BACKGROUND OF THE INVENTION

Field of the Invention

The present invention relates to managing systems and managing methods for managing tenants.

Description of the Related Art

In cloud systems, the data of customers that use the system is managed in units called tenants, where each customer has a dedicated area. There are also cases where a service provider is contracted by a customer to manage that customer's data. In the case where a service provider manages a large-scale customer in which multiple group companies or bases of operations are present, it is difficult for a single service provider to handle the management of that customer. As such, by sharing the management of a customer with another service provider, a single customer is managed by a sharing source service provider and a sharing destination service provider. In the case where a sharing source-sharing destination relationship exists between service providers, the sharing source service provider typically has more usable functions than the sharing destination service provider. For example, the sharing source service provider can cancel the sharing relationship, restrict the functions the sharing destination service provider can use, and so on.

With such systems, there are cases where the service provider ceases to exist due to elimination/consolidation of the service provider company or the like. Japanese Patent Laid-Open No. 2013-196649 discloses a technique for a tenant managing apparatus employing user identification information, public tenant information of managing devices, and so on. According to Japanese Patent Laid-Open No. 2013-196649, the managing apparatus is capable of lightening the burden of system transfers when consolidating tenants, splitting tenants up, and so on.

For example, in the case where a service provider ceases to exist due to elimination/consolidation of the service provider company or the like, a replacement service provider provides services to the customer, and it is thus necessary to transfer the information managed by a transfer source service provider to a transfer destination service provider. It is also necessary to change the information regarding the customer management sharing mentioned above when transferring information managed by the transfer source service provider to the transfer destination service provider. For example, consider a case of a transfer from a service provider X to a service provider A. In this case, sharing information indicating that "service provider B shares with service provider X" is changed to "service provider B shares with service provider A".

However, the sharing information cannot be changed as described above in the case where the transfer source service provider X and the transfer destination service provider A have been sharing the management of the same customer before the transfer. If, for example, sharing information indicating that "service provider A shares with service provider X" is changed as described above, the information will become "service provider A shares with service provider A". This sharing information is incorrect, and for example, in an environment where the sharing source service provider has more usable functions than the sharing destination service provider, there is a risk that correct function restrictions cannot be carried out.

SUMMARY OF THE INVENTION

An aspect of the present invention is to eliminate the above-mentioned problems with the conventional technology. The present invention provides a managing system and a managing method that correctly change a sharing relationship for management information between service providers when transferring service providers.

The present invention in one aspect provides a managing system, a managing system that manages management information using a plurality of tenants that form a hierarchical structure, the system comprising: a first designating unit configured to designate a first tenant, of the plurality of tenants, that manages management information to be transferred between tenants; a second designating unit configured to designate a second tenant to serve as a transfer destination for the management information that is to be transferred from the first tenant specified by the first designating unit; a specifying unit configured to specify second management information, of the management information managed by the first tenant, that is shared with another tenant, in accordance with a sharing relationship for the second management information; a transfer unit configured to transfer third management information, of the management information managed by the first tenant, except for the second management information specified by the specifying unit, to the second tenant; and a changing unit configured to change the sharing relationship for the second management information specified by the specifying unit to a sharing relationship in which the second management information is shared between the second tenant and a tenant in a level above or below the second tenant in accordance with a new hierarchical structure formed after the transfer performed by the transfer unit.

According to the present invention, a sharing relationship for management information between service providers can be correctly changed when transferring service providers.

Further features of the present invention will become apparent from the following description of exemplary embodiments with reference to the attached drawings.

BRIEF DESCRIPTION OF THE DRAWINGS

FIG. 5 is a diagram illustrating a service provider tenant information table.

FIGS. 6A and 6B are diagrams illustrating customer tenant information tables.

FIGS. 7A and 7B are diagrams illustrating managed customer tenant information tables.

FIGS. 8A and 8B are diagrams illustrating sharing information tables.

FIG. 9 is a diagram illustrating a sharing information table after a transfer process has been carried out.

FIG. 10 is a diagram conceptualizing the sharing state indicated in FIG. 8A.

FIG. 11 is a diagram conceptualizing a sharing state after a transfer process has been carried out.

FIG. 12 is another diagram conceptualizing a sharing state after a transfer process has been carried out.

FIGS. 13A and 13B are diagrams illustrating service provider transfer settings screens.

FIG. 14 is another diagram illustrating a service provider transfer settings screen.

FIGS. 17A and 17B are diagrams illustrating a procedure in a process indicated in S1605.

DESCRIPTION OF THE EMBODIMENTS

Figure 1:
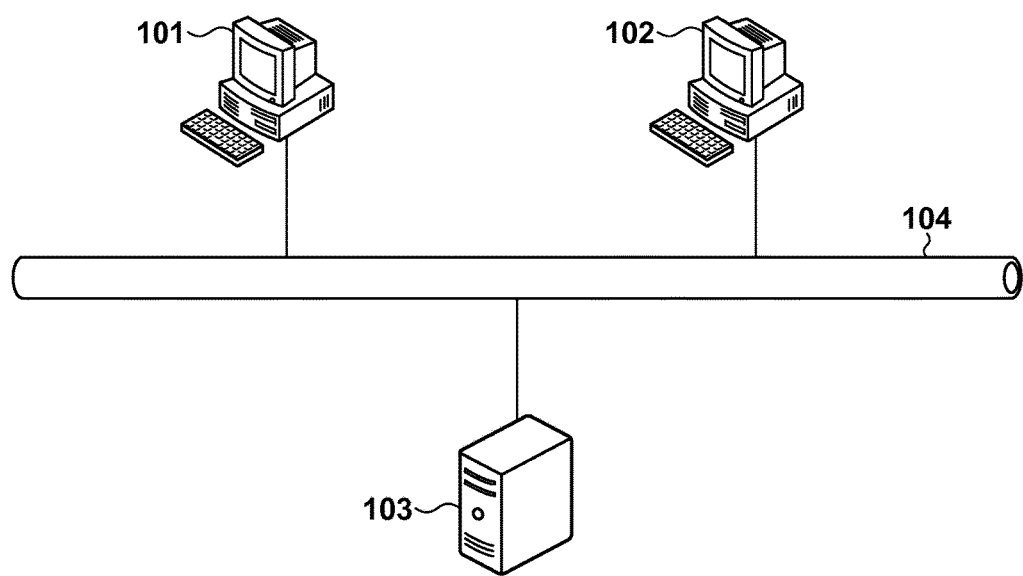
FIG. 1 is a diagram illustrating the configuration of a tenant managing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that identical constituent elements will be given identical reference numerals, and descriptions thereof will be omitted.

System Configuration

FIG. 1 is a diagram illustrating the configuration of a tenant managing system according to the present embodiment. This tenant managing system is used through a cloud-based service, for example. Generally, in a cloud-based service, data storage, user information, and the like is managed in units called tenants, which corresponds to a dedicated area in the system for each customer. For example, a customer that is a business or the like is a customer tenant, and a service provider tenant provides management/repair services and the like for printers, multifunction peripherals, and so on to a customer. Hereinafter, customer tenants and service provider tenants will be referred to collectively as managed tenants, or simply tenants.

In FIG. 1, a host computer 101 is used by a user (an administrator or the like) of a service provider tenant. The user of the service provider tenant carries out operations for managing data of a customer tenant held in a managing server 103. In the case where a given service provider ceases to exist due to elimination/consolidation of the service provider company, a user of the service provider tenant makes settings for transferring to another service provider in order to provide the service to the customer. Multiple host computers 101 may be present as well, one for each service provider tenant. A host computer 102 is used by a user (an administrator or the like) of a customer tenant. The user of the customer tenant carries out operations for managing data of the customer tenant held in the managing server 103. Multiple host computers 102 may be present as well, one for each customer tenant user.

The managing server 103 manages the data of multiple service provider tenants, customer tenants, and so on. Furthermore, in the case where a service provider transfer has been instructed by a user, the managing server 103 executes a process for transferring managed information managed by a transfer source service provider to a transfer destination service provider. Although the managing server 103 is illustrated as a single server in FIG. 1, the functions of the managing server 103 may be implemented by multiple managing servers 103. Meanwhile, the host computers 101 and 102 and the managing server 103 are communicably connected by a network 104 such as a LAN, the Internet, or the like.

Hardware Configurations of Respective Devices

Figure 2:
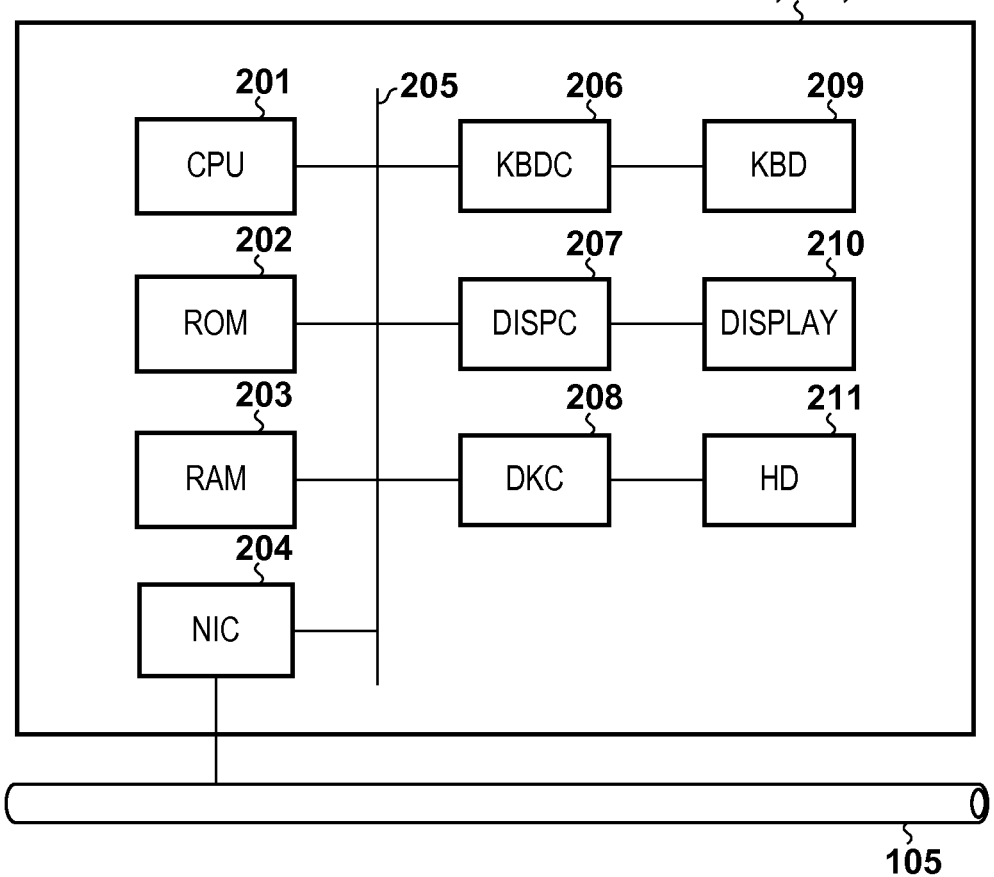
FIG. 2 is a block diagram illustrating the internal configuration of an information processing apparatus.

FIG. 2 is a block diagram illustrating an example of the internal configuration of an information processing apparatus that configures the host computers 101 and 102 and the managing server 103. The host computers 101 and 102 and the managing server 103 each includes a CPU 201 that executes software stored in a ROM 202 or hard disk (HD) 211, which is a storage device. The CPU 201 performs overall control of the respective pieces of hardware connected to a system bus 205. A RAM 203 functions as the main memory, a working area, and so on for the CPU 201.

A network interface card (NIC) 204 sends and receives data in both directions to and from other devices via the network 104. A keyboard controller (KBDC) 206 controls communication with a keyboard (KBD) 209. A display controller (DISPC) 207 controls communication with a display module (DISPLAY) 210 configured of a liquid crystal display, for example. A disk controller (DKC) 208 controls communication with the hard disk (HD) 211, which is a high-capacity storage device.

Functional Configuration of Host Computers

Figure 3:
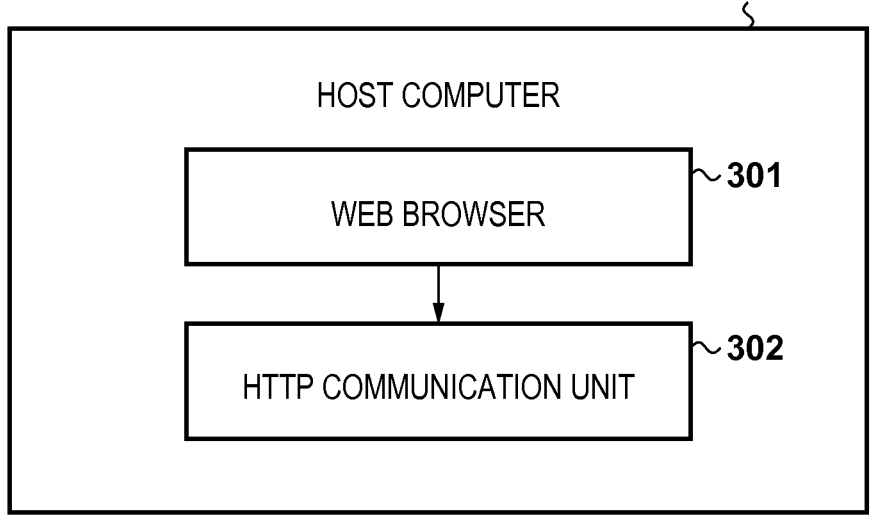
FIG. 3 is a block diagram illustrating the functional configuration of a host computer.

FIG. 3 is a block diagram illustrating an example of the functional configuration of the host computers 101 and 102 illustrated in FIG. 1. A Web browser 301 analyzes HTML data, carries out rendering processes for displaying screens in the display module 210, and sends HTTP request commands to an HTTP communication unit 302 based on user operations accepted from the keyboard or the like. The HTTP communication unit 302 communicates with the managing server 103 via the NIC 204 through a protocol such as HTTP or HTTPS in response to the communication request from the Web browser 301, and carries out communication such as requesting Web pages, receiving Web page data, and so on.

Functional Configuration of Managing Server

Figure 4:
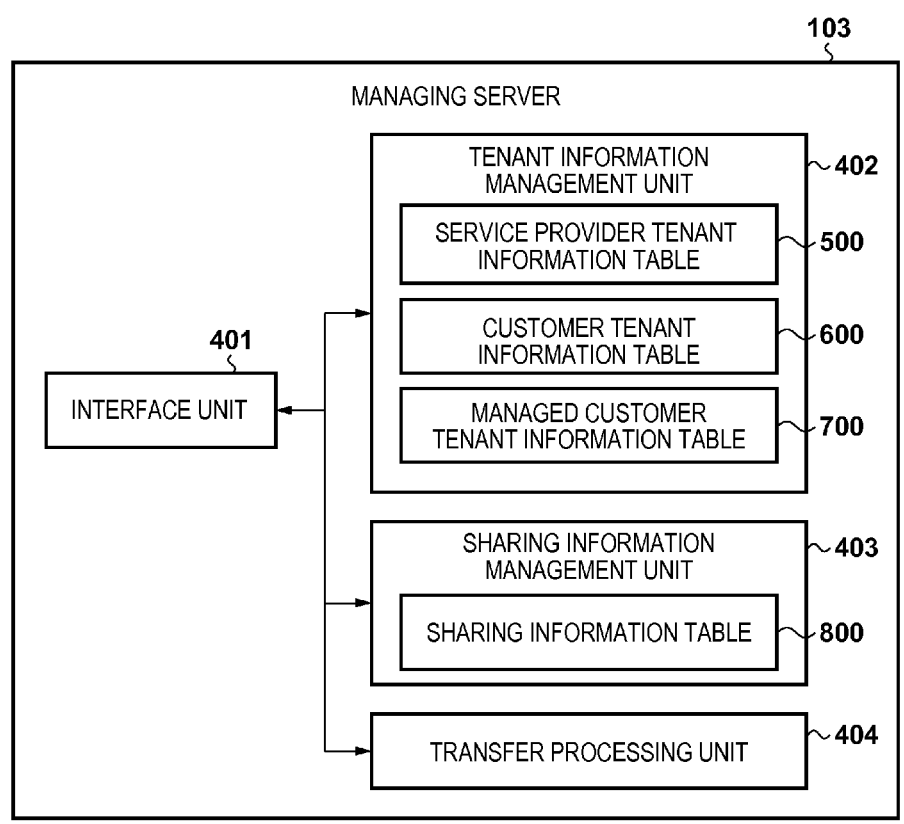
FIG. 4 is a block diagram illustrating the functional configuration of a managing server.

FIG. 4 is a block diagram illustrating an example of the functional configuration of the managing server 103 illustrated in FIG. 1. An interface unit 401 controls the communication with the host computer 101 via the network 104 through the NIC 204 illustrated in FIG. 2. When there is an HTTP or HTTPS request for a Web page from the host computers 101 and 102, the interface unit 401 determines an access permission state and the like and then returns HTML data.

A tenant information managing unit 402 holds information regarding the service provider tenants and the customer tenants. The tenant information managing unit 402 furthermore holds information regarding the customer tenants to be managed by each service provider (customer information). A sharing information managing unit 403 holds sharing information indicating what customer tenants a given service provider is sharing with other service providers. The sharing information corresponds to part of the managed information managed by each service provider. For example, customer tenant information managed only by a specific service provider is managed information, and customer tenant information also shared with another service provider is both managed information and sharing information.

By sharing the management of a customer with another service provider (a sharing destination), a single customer is managed by multiple service providers, namely a sharing source and a sharing destination. In the case where a sharing source-sharing destination relationship exists between service providers, the sharing source service provider typically has more usable functions than the sharing destination service provider. For example, the sharing source service provider can cancel the sharing relationship, restrict the functions the sharing destination service provider can use, and so on. In the present embodiment, a hierarchical structure is established by such a sharing relationship among tenants present in the tenant managing system.

A transfer processing unit 404 executes a process for transferring information managed by a transfer source service provider to a transfer destination service provider in the case where a service provider transfer has been instructed by a user.

Service Provider Tenant Information Table

FIG. 5 is a diagram illustrating an example of a service provider tenant information table 500 managed by the tenant information managing unit 402 illustrated in FIG. 4. The service provider tenant information table 500 indicates a list of service provider tenants present in the system. A service provider tenant ID 501 is identification information (an ID) for identifying the service provider tenant uniquely within the system. A service provider tenant name 502 indicates a name of the service provider tenant indicated by the service provider tenant ID 501. Each setting value in the service provider tenant information table 500 can be set/changed by a user via an input device of the managing server 103. Meanwhile, the service provider tenant information table 500 may be configured for each service provider tenant by, for example, making it possible to differentiate the tables by filename.

Customer Tenant Information Table

FIG. 6A is a diagram illustrating an example of a customer tenant information table 600 managed by the tenant information managing unit 402 illustrated in FIG. 4. The customer tenant information table 600 indicates a list of customer tenants present in the system. A customer tenant ID 601 is an ID for identifying the customer tenant uniquely within the system. A customer tenant name 602 indicates a name of the customer tenant indicated by the customer tenant ID 601. A licensing service provider tenant ID 603 indicates the ID of a service provider tenant that has provided a license, to the customer tenant, for identifying the sharing information located at the root of the hierarchical structure.

The various settings values in the customer tenant information table 600 can be set/changed by a user via an input device of the managing server 103. Meanwhile, the customer tenant information table 600 may be configured for each customer tenant by, for example, making it possible to differentiate the tables by filename. FIG. 6B illustrates the customer tenant information table 600 after a transfer process according to the present embodiment has been carried out, and will be described later.

Managed Customer Tenant Information Table

FIG. 7A is a diagram illustrating an example of a managed customer tenant information table 700 managed by the tenant information managing unit 402 illustrated in FIG. 4. The managed customer tenant information table 700 is a list of customer tenants managed by a service provider table. A service provider tenant ID 701 is an ID for identifying the service provider tenant uniquely within the system. A managed customer tenant ID 702 is an ID for identifying the customer tenant uniquely within the system. In FIG. 7A, the service provider indicated by the service provider tenant ID 701 manages the customers indicated by the corresponding managed customer tenant IDs 702 in each row.

The various settings values in the managed customer tenant information table 700 can be set/changed by a user via an input device of the managing server 103. Meanwhile, the managed customer tenant information table 700 may be configured for each service provider tenant by, for example, making it possible to differentiate the tables by filename. FIG. 7B illustrates the managed customer tenant information table 700 after the transfer process according to the present embodiment has been carried out, and will be described later.

Sharing Information Table

FIG. 8A is a diagram illustrating an example of a sharing information table 800 managed by the sharing information managing unit 403 illustrated in FIG. 4. A customer tenant ID 801 is an ID for identifying the customer tenant uniquely within the system. A sharing source service provider tenant ID 802 is an ID for identifying the service provider tenant that manages the customer tenant corresponding to the corresponding customer tenant ID in each row. A sharing destination service provider tenant ID 803 is an ID for identifying the service provider permitted to share by the sharing source service provider tenant. For example, in a row 804, a sharing source service provider tenant S000B shares the management of a customer tenant C0003 with a sharing destination service provider tenant S000X.

The various settings values in the sharing information table 800 can be set/changed by a user via an input device of the managing server 103. FIGS. 8B and 9 illustrate the sharing information table 800 after the transfer process according to the present embodiment has been carried out, and will be described later.

FIG. 10 is a diagram conceptualizing the sharing state indicated in FIG. 8A. For example, a customer 3 in FIG. 10 corresponds to C0003 in FIG. 8A, a service provider B corresponds to S000B, and a service provider X corresponds to S000X. In other words, in FIG. 8A, the customer tenant whose customer tenant ID 801 is C0003 is shared by the sharing source service provider tenant S000B with the sharing destination service provider tenant S000X. Furthermore, the service provider tenant S000X acts as a sharing source service provider tenant and shares with a service provider tenant S000C. The "customer 3 sharing state" illustrated in FIG. 10 expresses this sharing state. The other customers illustrated in FIG. 10 also follow the details written in FIG. 8A. Note that in FIG. 10, "customer tenant" is abbreviated as "customer", and "service provider tenant" is abbreviated as "service provider". FIGS. 11 and 12 illustrate the sharing state after the transfer process according to the present embodiment has been carried out, and will be described later.

Service Provider Transfer Settings Screen

FIG. 13A is a diagram illustrating an example of a service provider transfer settings screen. The service provider transfer settings screen is a settings screen for accepting operations for setting and executing service provider transfers through the host computer 101. In the service provider transfer settings screen, a transfer source service provider 1301, a transfer destination service provider 1302, and a transfer target customer 1303 can be set (designated). When a user sets the respective pieces of information and presses a transfer button 1304, the settings details are set in an HTTP request and sent to the managing server 103.

Figure 13B:
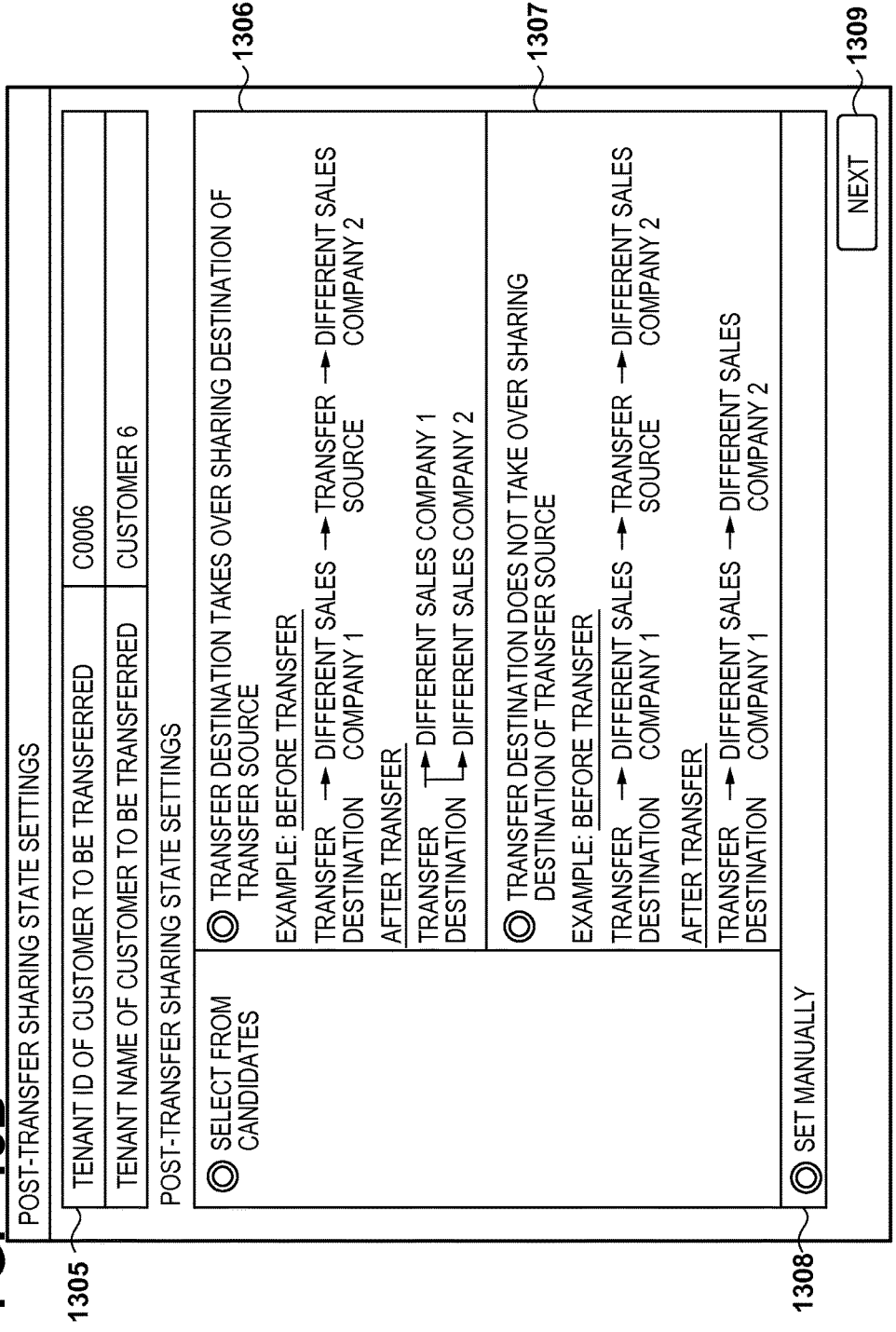

In the managing server 103, the HTTP request is received by the interface unit 401 and it is checked whether there are any problems in the information that has been entered. Here, the screen illustrated in FIG. 13B is displayed in the case where there is a customer for which an indirect sharing destination of the transfer destination service provider is the transfer source service provider. For example, the display item in FIG. 13B that reads "transfer destination takes over sharing destination of transfer source" indicates that management is shared by the transfer destination with a different sales company 1 and is further shared with the transfer source. Meanwhile, a screen illustrated in FIG. 14 is displayed in the case where there is a customer for which an indirect sharing destination of the transfer source service provider is the transfer destination service provider. For example, the display item in FIG. 14 that reads "transfer destination takes over sharing destination of transfer source" indicates that management is shared by the transfer source with the different sales company 1 and is further shared with the transfer destination. In cases aside from those described above, the interface unit 401 sends a transfer process request to the transfer processing unit 404.

FIG. 13B is a diagram illustrating an example of a post-transfer sharing state settings screen displayed in the case where there is a customer for which an indirect sharing destination of the transfer destination service provider is the transfer source service provider. In the case where the transfer destination service provider and the transfer source service provider have an indirect sharing relationship, it is unclear which service provider the transfer destination service provider is permitted to share with, and thus the post-transfer sharing state cannot be uniquely determined.

Accordingly, in the present embodiment, displaying post-transfer sharing state candidates enables the user to select the state prior to the transfer, as illustrated in FIG. 13B. In the post-transfer sharing state settings screen, it is possible to select, for the post-transfer sharing state of a customer 1305, a candidate 1306 in which the transfer destination service provider is set as taking over (applying) the pre-transfer sharing destination of the transfer source service provider or a candidate 1307 in which the transfer destination service provider is set as not taking over. Meanwhile, in the case where the user wishes to set a sharing state that does not correspond to the candidate 1306 or the candidate 1307, a candidate 1308 for a manual setting can be selected for the post-transfer sharing state. In this case, the user can set a desired sharing state.

When a user sets the respective pieces of information and presses a next button 1309, the settings details are set in an HTTP request and sent to the managing server 103. In the managing server 103, the HTTP request is received by the interface unit 401 and it is checked whether there are any problems in the information that has been entered. Here, in the case where there is a customer for which there is an indirect sharing relationship between the transfer destination service provider and the transfer source service provider, the screen illustrated in FIG. 13B or in FIG. 14 is displayed once again. In cases aside from those described above, the interface unit 401 sends a transfer process request to the transfer processing unit 404.

FIG. 14 is a diagram illustrating an example of a post-transfer sharing state settings screen displayed in the case where there is a customer for which an indirect sharing destination of the transfer source service provider is the transfer destination service provider. Like FIG. 13B, in the case where the transfer destination service provider and the transfer source service provider have an indirect sharing relationship, it is unclear which service provider the transfer destination service provider is permitted to be shared with, and thus the post-transfer sharing state cannot be uniquely determined.

Accordingly, in the present embodiment, displaying post-transfer sharing state candidates enables the user to select the state prior to the transfer, as illustrated in FIG. 14. In the post-transfer sharing state settings screen, it is possible to select, for the post-transfer sharing state of a customer 1401, a candidate 1402 in which the transfer destination service provider is set as taking over its own pre-transfer sharing destination or a candidate 1403 in which the transfer destination service provider is set as not taking over. Meanwhile, in the case where the user wishes to set a sharing state that does not correspond to the candidate 1402 or the candidate 1403, a candidate 1404 for a manual setting can be selected for the post-transfer sharing state. In this case, the user can set a desired sharing state.

When a user sets the respective pieces of information and presses a next button 1405, the settings details are set in an HTTP request and sent to the managing server 103. In the managing server 103, the HTTP request is received by the interface unit 401 and it is checked whether there are any problems in the information that has been entered. Here, in the case where there is a customer for which there is an indirect sharing relationship between the transfer destination service provider and the transfer source service provider, the screen illustrated in FIG. 13B or in FIG. 14 is displayed once again. In cases aside from those described above, the interface unit 401 sends a transfer process request to the transfer processing unit 404. Upon receiving the transfer process request, the transfer processing unit 404 executes the following transfer process.

Transfer Process

Figure 15:
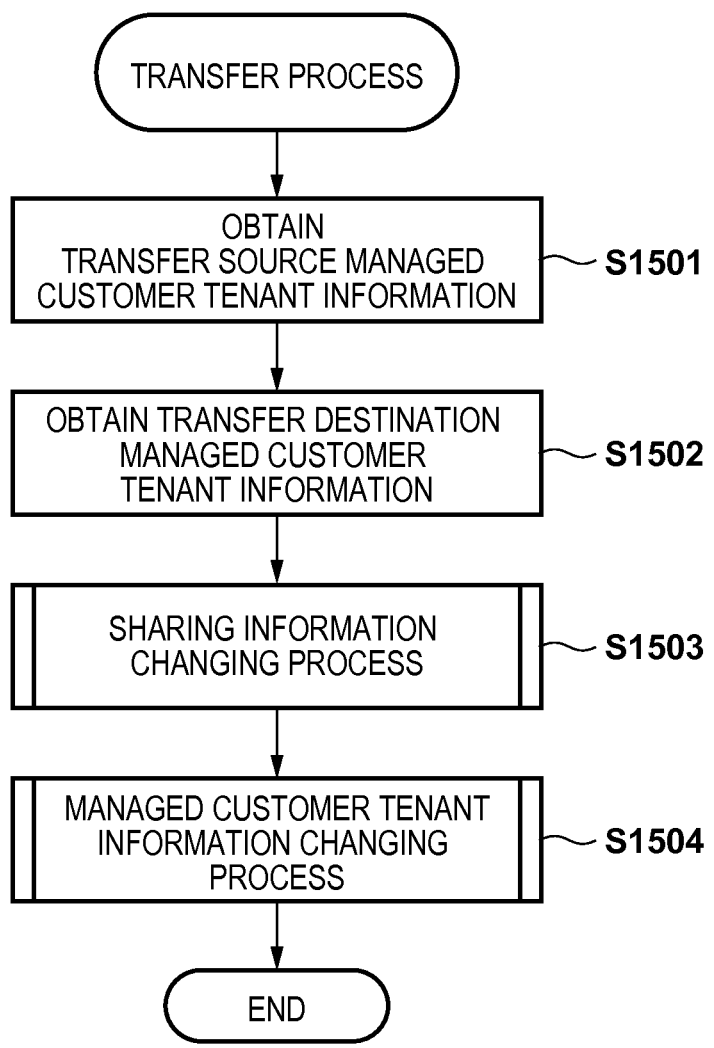
FIG. 15 is a diagram illustrating procedures in a service provider transfer process.

FIG. 15 is a flowchart illustrating procedures in a service provider transfer process executed by the transfer processing unit 404 illustrated in FIG. 4. The managing server 103 illustrated in FIG. 1 carries out the processing illustrated in FIG. 15 as an information processing apparatus. The managing server 103 executes this process when service provider transfer settings have been carried out using the service provider transfer settings screen illustrated in FIG. 13. Each process in FIG. 15 is realized by, for example, the CPU 201 loading a control program from the HD 211, the ROM 202, or the like into the RAM 203 and executing the program.

When the transfer process starts, in S1501, the transfer processing unit 404 refers to the sharing information held in the managed customer tenant information table 700 and obtains the managed customer tenant information managed by the transfer source service provider. Next, in S1502, the transfer processing unit 404 refers to the sharing information held in the managed customer tenant information table 700 and obtains the managed customer tenant information managed by the transfer destination service provider.

Next, in S1503, the transfer processing unit 404 carries out a sharing information changing process. The process of S1503 will be described in detail later. Then, in S1504, the transfer processing unit 404 carries out the changing process for the managed customer tenant information, and ends the processing. The process of S1504 will be described in detail later.

Sharing Information Changing Process

Figure 16:
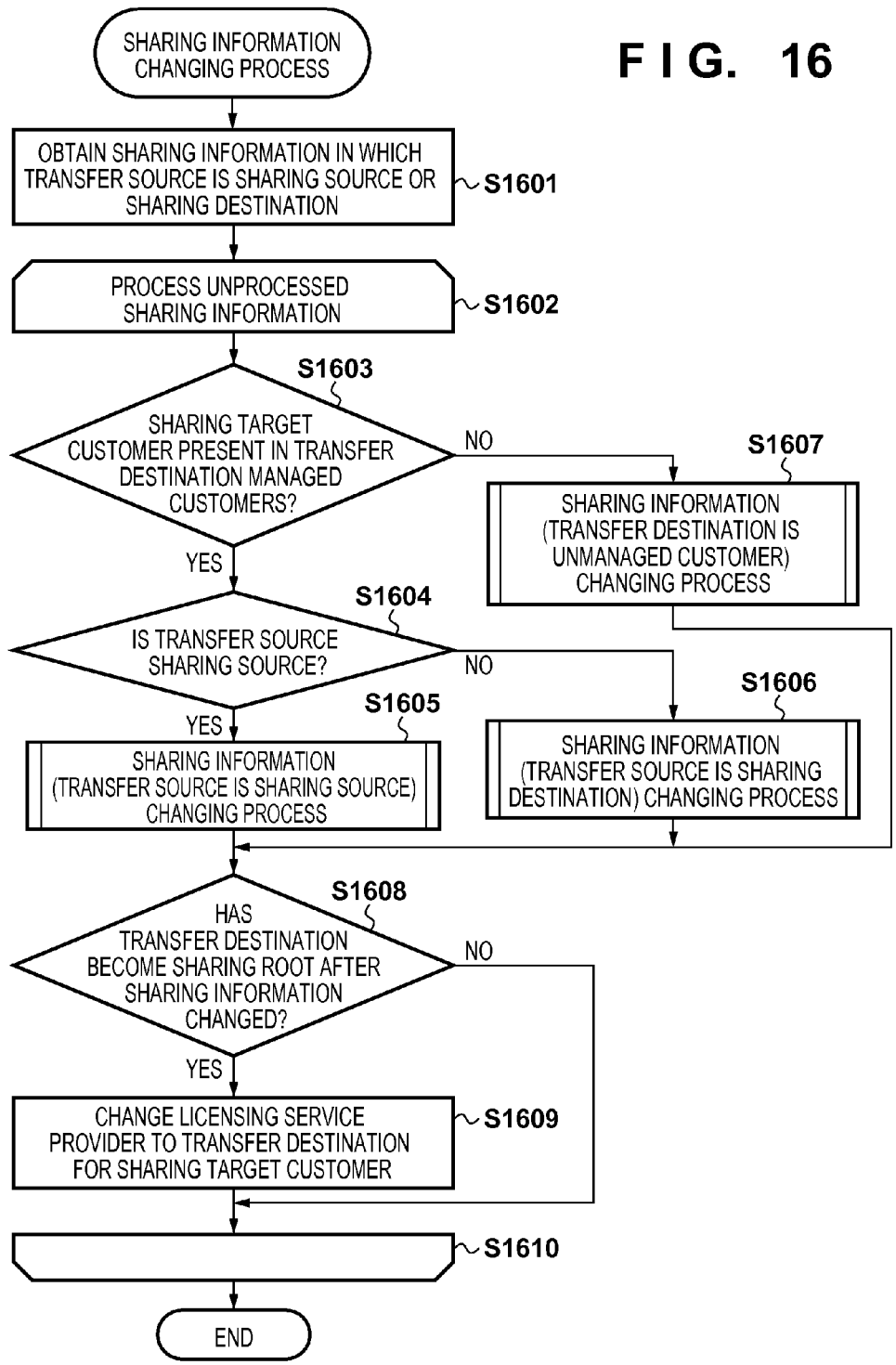
FIG. 16 is a diagram illustrating a procedure in a sharing information changing process indicated in S1503.

FIG. 16 is a flowchart illustrating a detailed procedure of the sharing information changing process carried out in S1503 of FIG. 15. The post-transfer service provider sharing state becomes a correct state as a result of the sharing information being changed by this process.

When the sharing information changing process starts, in S1601, the transfer processing unit 404 refers to the sharing information, which is part of the managed information, held in the sharing information table 800, and specifies and acquires the sharing information in which the transfer source service provider is the sharing source service provider or the sharing destination service provider. The transfer processing unit 404 then repeats the processes of S1602 to S1610 for each instance of sharing information obtained in S1601.

In S1603, the transfer processing unit 404 determines, for the sharing information currently being process, whether or not the customer tenant that is the sharing target is present in the managed customer tenants of the transfer destination service provider. Here, the process moves to S1604 in the case where it is determined that the customer tenant that is the sharing target is present in the managed customer tenants of the transfer destination service provider, whereas the process moves to S1607 in the case where it is determined that the customer tenant that is the sharing target is not present in the managed customer tenants of the transfer destination service provider.

In S1604, the transfer processing unit 404 determines, for the sharing information currently being processed, whether or not the transfer source service provider is the sharing source service provider. Here, the process moves to S1605 in the case where it has been determined that the transfer source service provider is the sharing source service provider, whereas the process moves to S1606 in the case where it has been determined that the transfer source service provider is not the sharing source service provider. A determination that the transfer source service provider is not the sharing source service provider means that the transfer source service provider is the sharing destination service provider.

In S1605, the transfer processing unit 404 carries out a changing process for the sharing information in which the transfer source service provider is the sharing source service provider. The process of S1605 will be described in detail later. Meanwhile, in S1606, the transfer processing unit 404 carries out a changing process for the sharing information in which the transfer source service provider is the sharing destination service provider. The process of S1606 will be described in detail later. Meanwhile, in S1607, the transfer processing unit 404 carries out a changing process for the sharing information for a customer not managed by the transfer destination service provider. The process of S1607 will be described in detail later.

In S1608, the transfer processing unit 404 determines whether or not the transfer destination service provider has become a sharing root (the highest position in the sharing relationship) as a result of the sharing information changing processes carried out in S1605, S1606, and S1607. Here, the "sharing root" refers to a state in which there is no service provider sharing with the transfer destination service provider for the customer tenant that is the sharing target. The process moves to S1609 in the case where it has been determined in S1608 that the transfer destination service provider has become the sharing root, whereas the process moves to S1610 in the case where it has been determined that the transfer destination service provider has not become the sharing root.

In S1609, the transfer processing unit 404 changes the licensing service provider tenant ID 603 to the tenant ID of the transfer destination service provider for the customer tenant that is the sharing target in the sharing information currently being processed. This is done in order to prevent the absence of a service provider that has licensed the customer after the service provider transfer.

In S1610, the transfer processing unit 404 determines whether or not there is sharing information for which the processes of S1602 to S1610 have not been carried out. Here, the processing is repeated from S1602 in the case where it has been determined that there is sharing information for which the processes of S1602 to S1610 have not been carried out. On the other hand, the processing illustrated in FIG. 16 ends in the case where it has been determined that there is no sharing information for which the processes of S1602 to S1610 have not been carried out.

Sharing Information Changing Process (When Transfer Source Provider is Sharing Source Provider)

Figure 17B:
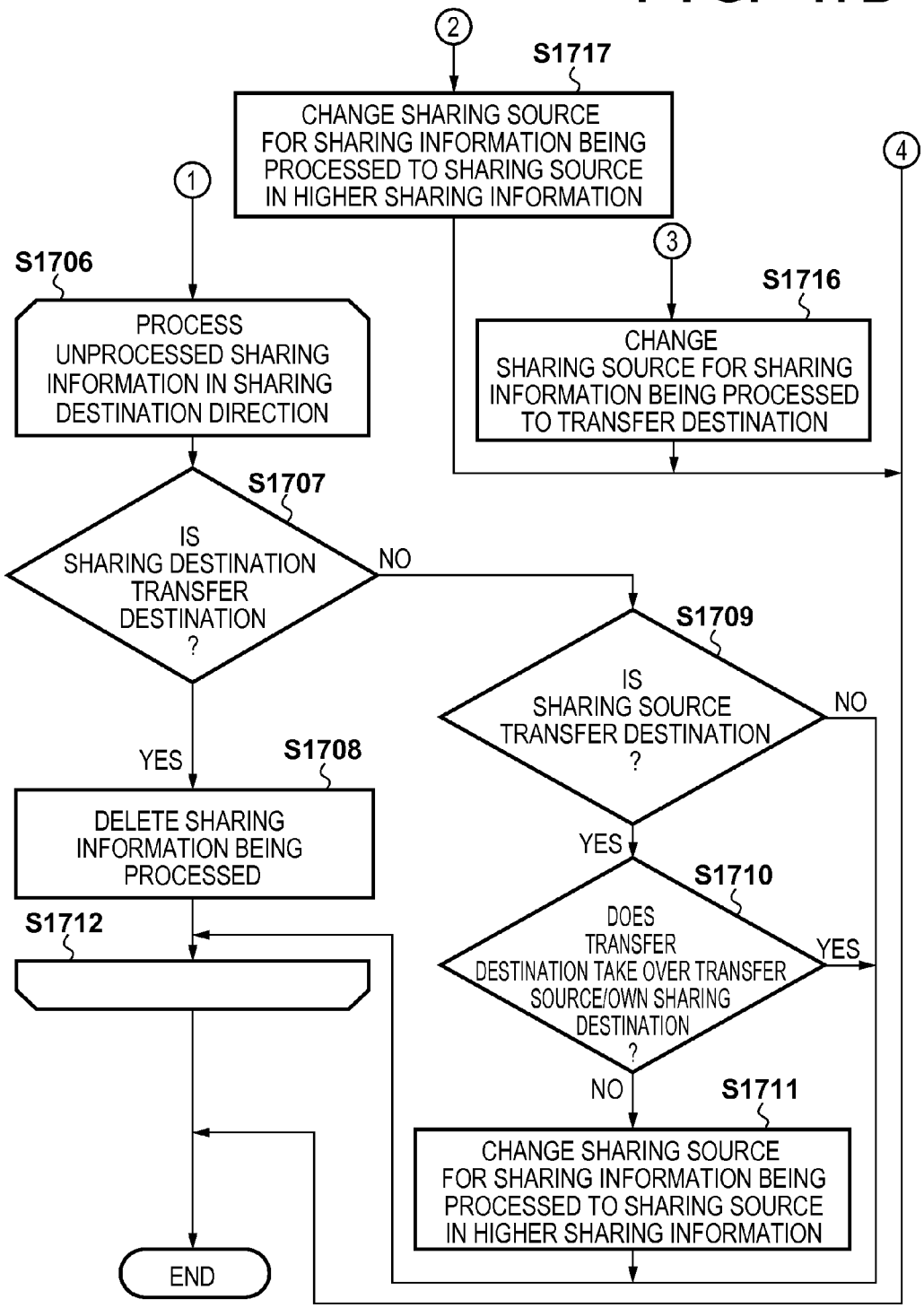

FIGS. 17A and 17B is a flowchart illustrating, in detail, procedures in the process of S1605 illustrated in FIG. 16. In this process, sharing information in which the transfer source service provider is the sharing source service provider is changed.

When the sharing information changing process starts, in S1701, the transfer processing unit 404 determines, for the sharing information currently being processed, whether or not the sharing destination service provider is the transfer destination service provider. Here, the process moves to S1702 in the case where it has been determined that the sharing destination service provider is the transfer destination service provider, whereas the process moves to S1703 in the case where it has been determined that the sharing destination service provider is not the transfer destination service provider.

In S1702, the transfer processing unit 404 deletes the sharing information currently being processed from the sharing information table, and ends the processing illustrated in FIGS. 17A and 17B. In S1703, the transfer processing unit 404 refers to the sharing information held in the sharing information table and obtains all the sharing information in a sharing destination direction, in the sharing information currently being processed. For example, in the case where a service provider A is the sharing source that takes the service provider B as a sharing destination and the service provider B is a sharing source that takes a service provider C as a sharing destination, the "sharing destination direction" from A corresponds to B and C. In other words, the sharing information in the sharing destination direction is the information included in the connections leading to the sharing destination within the sharing relationship.

In S1704, the transfer processing unit 404 determines, based on the sharing information obtained in S1703, whether or not there is a transfer destination service provider in the sharing destination direction. Here, the process moves to S1705 in the case where it has been determined that a transfer destination service provider is present in the sharing destination direction, whereas the process moves to S1713 in the case where it has been determined that a transfer destination service provider is not present in the sharing destination direction.

In S1705, the transfer processing unit 404 changes the sharing source service provider tenant ID 802 to the tenant ID of the transfer destination service provider in the sharing information currently being processed. The transfer processing unit 404 then repeats the processes of S1706 to S1712 for each instance of sharing information in the sharing destination direction obtained in S1703.

In S1707, the transfer processing unit 404 determines, for the sharing information in the sharing destination direction currently being processed, whether or not the sharing destination service provider is the transfer destination service provider. Here, the process moves to S1708 in the case where it has been determined that the sharing destination service provider is the transfer destination service provider, whereas the process moves to S1709 in the case where it has been determined that the sharing destination service provider is not the transfer destination service provider.

In S1708, the transfer processing unit 404 deletes the sharing information in the sharing destination direction currently being processed from the sharing information table. In S1709, the transfer processing unit 404 determines, for the sharing information in the sharing destination direction currently being processed, whether or not the sharing source service provider is the transfer destination service provider. Here, the process moves to S1710 in the case where it has been determined that the sharing source service provider is the transfer destination service provider, whereas the process moves to S1712 in the case where it has been determined that the sharing source service provider is not the transfer destination service provider.

In S1710, the transfer processing unit 404 determines whether or not a setting 1306 or a setting 1402 is selected in the post-transfer sharing state settings screen as the post-transfer sharing state. In other words, in S1710, it is determined, based on the settings in the post-transfer sharing state settings screen, whether or not the transfer destination service provider will take over the sharing destination of the transfer source service provider/its own sharing destination. Here, the process moves to S1712 in the case where it has been determined that the setting 1306 or the setting 1402 is selected as the post-transfer sharing state. On the other hand, the process moves to S1711 in the case where it has been determined that the setting 1306 or the setting 1402 is not selected as the post-transfer sharing state. The case where it has been determined that the setting 1306 or the setting 1402 is not selected means that a setting 1307 or a setting 1403 is selected as the post-transfer sharing state.

In S1711, the transfer processing unit 404 changes the sharing source service provider tenant ID 802 to the tenant ID of the transfer destination service provider one level above in the sharing relationship, in the sharing information currently being processed.

In S1712, the transfer processing unit 404 determines whether or not there is sharing information in the sharing destination direction for which the processes of S1706 to S1712 have not been carried out. Here, the processing is repeated from S1706 in the case where it has been determined that there is sharing information in the sharing destination direction for which the processes of S1706 to S1712 have not been carried out. On the other hand, the processing illustrated in FIGS. 17A and 17B ends in the case where it has been determined that there is no sharing information in the sharing destination direction for which the processes of S1706 to S1712 have not been carried out.

In S1713, the transfer processing unit 404 refers to the sharing information held in the sharing information table and obtains all the sharing information in the sharing source direction, in the sharing information currently being processed. For example, in the case where the service provider B is the sharing source that takes the service provider A as a sharing destination and the service provider C is a sharing source that takes the service provider B as a sharing destination, the "sharing source direction" from A corresponds to B and C. In other words, the sharing information in the sharing source direction is the information included in the connections leading to the sharing source within the sharing relationship.

In S1714, the transfer processing unit 404 determines, based on the sharing information obtained in S1713, whether or not there is a transfer destination service provider in the sharing source direction. Here, the process moves to S1715 in the case where it has been determined that a transfer destination service provider is present in the sharing source direction, whereas the process moves to S1716 in the case where it has been determined that a transfer destination service provider is not present in the sharing source direction.

In S1715, the transfer processing unit 404 determines whether or not the setting 1306 or the setting 1402 is selected in the post-transfer sharing state settings screen as the post-transfer sharing state. In other words, in S1715, it is determined, based on the settings in the post-transfer sharing state settings screen, whether or not the transfer destination service provider will take over the sharing destination of the transfer source service provider/its own sharing destination. Here, the process moves to S1716 in the case where it has been determined that the setting 1306 or the setting 1402 is selected as the post-transfer sharing state. One the other hand, the process moves to S1717 in the case where it has been determined that the setting 1306 or the setting 1402 is not selected as the post-transfer sharing state. The case where it has been determined that the setting 1306 or the setting 1402 is not selected means that a setting 1307 or a setting 1403 is selected as the post-transfer sharing state.

In S1716, the transfer processing unit 404 changes the sharing source service provider tenant ID 802 to the tenant ID of the transfer destination service provider in the sharing information currently being processed, and ends the processing illustrated in FIGS. 17A and 17B. Meanwhile, in S1717, the transfer processing unit 404 changes the sharing source service provider tenant ID 802 to the tenant ID of the service provider one level above in the sharing relationship, in the sharing information currently being processed, and ends the processing illustrated in FIGS. 17A and 17B.

Sharing Information Changing Process (When Transfer Source Provider is Sharing Destination Provider)

Figure 18:
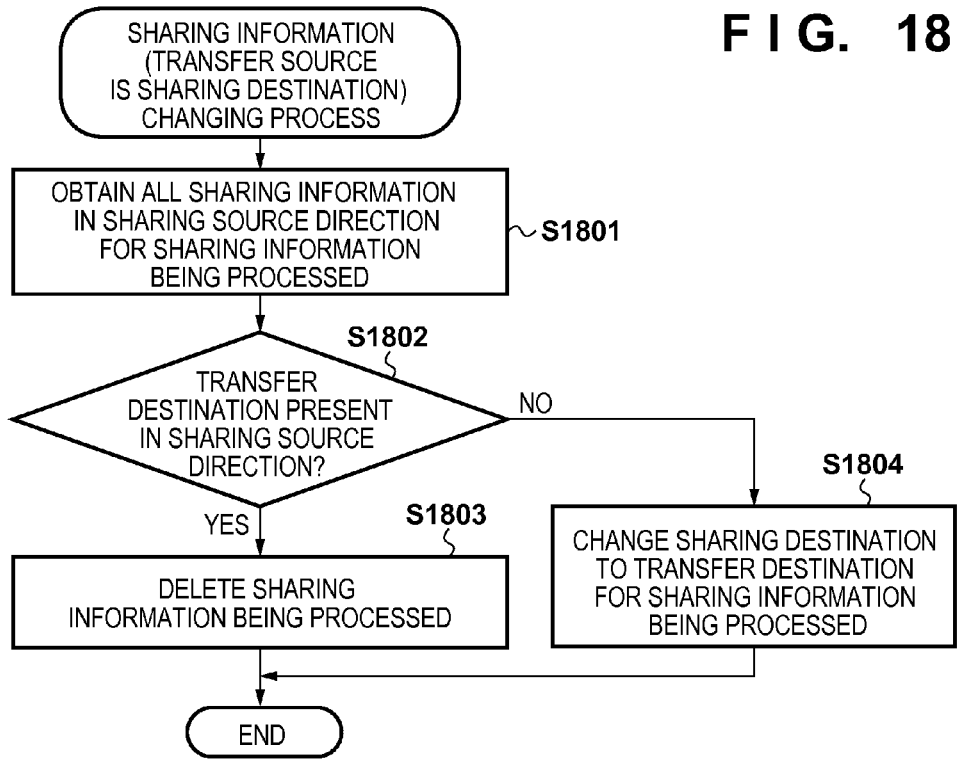
FIG. 18 is a diagram illustrating a procedure in a process indicated in S1606.

FIG. 18 is a flowchart illustrating, in detail, procedures in the process of S1606 illustrated in FIG. 16. In this process, sharing information in which the transfer source service provider is the sharing destination service provider is changed.

When the sharing information changing process starts, in S1801, the transfer processing unit 404 refers to the sharing information held in the sharing information table 800 and obtains all the sharing information in the sharing source direction, in the sharing information currently being processed.

In S1802, the transfer processing unit 404 determines, based on the sharing information obtained in S1801, whether or not there is a transfer destination service provider in the sharing source direction. Here, the process moves to S1803 in the case where it has been determined that a transfer destination service provider is present in the sharing source direction, whereas the process moves to S1804 in the case where it has been determined that a transfer destination service provider is not present in the sharing source direction.

In S1803, the transfer processing unit 404 deletes the sharing information currently being processed from the sharing information table, and ends the processing illustrated in FIG. 18. Meanwhile, in S1804, the transfer processing unit 404 changes the sharing destination service provider tenant ID 803 to the tenant ID of the transfer destination service provider, in the sharing information currently being processed, and ends the processing illustrated in FIG. 18.

Sharing Information Changing Process (Customer Tenant not Managed by Transfer Destination Provider)

Figure 19:
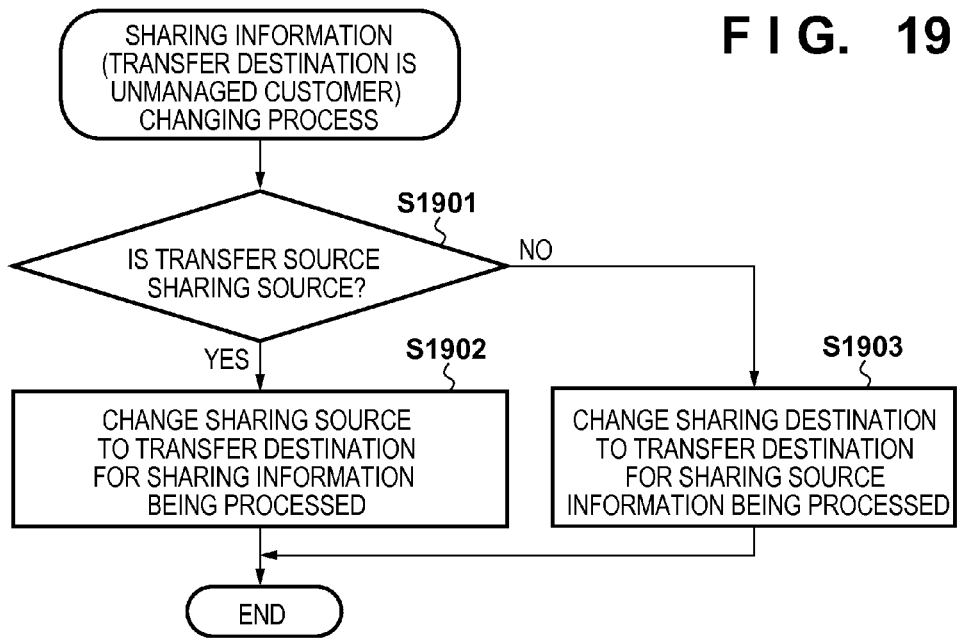
FIG. 19 is a diagram illustrating a procedure in a process indicated in S1607.

FIG. 19 is a flowchart illustrating, in detail, procedures in the process of S1607 illustrated in FIG. 16. This process is a sharing information changing process for a customer tenant not managed by the transfer destination service provider.

When the sharing information changing process starts, in S1901, the transfer processing unit 404 determines, for the sharing information currently being processed, whether or not the transfer source service provider is the sharing source service provider. Here, the process moves to S1902 in the case where it has been determined that the transfer source service provider is the sharing source service provider, whereas the process moves to S1903 in the case where it has been determined that the transfer source service provider is not the sharing source service provider. Sharing information for which it has been determined that the transfer source service provider is not the sharing source service provider is sharing information in which the transfer source service provider is the sharing destination service provider.

In S1902, the transfer processing unit 404 changes the sharing source service provider tenant ID 802 to the tenant ID of the transfer destination service provider in the sharing information currently being processed, and ends the processing illustrated in FIG. 19. Meanwhile, in S1903, the transfer processing unit 404 changes the sharing destination service provider tenant ID 803 to the tenant ID of the transfer destination service provider, in the sharing information currently being processed, and ends the processing illustrated in FIG. 19.

Managed Customer Tenant Information Changing Process

Figure 20:
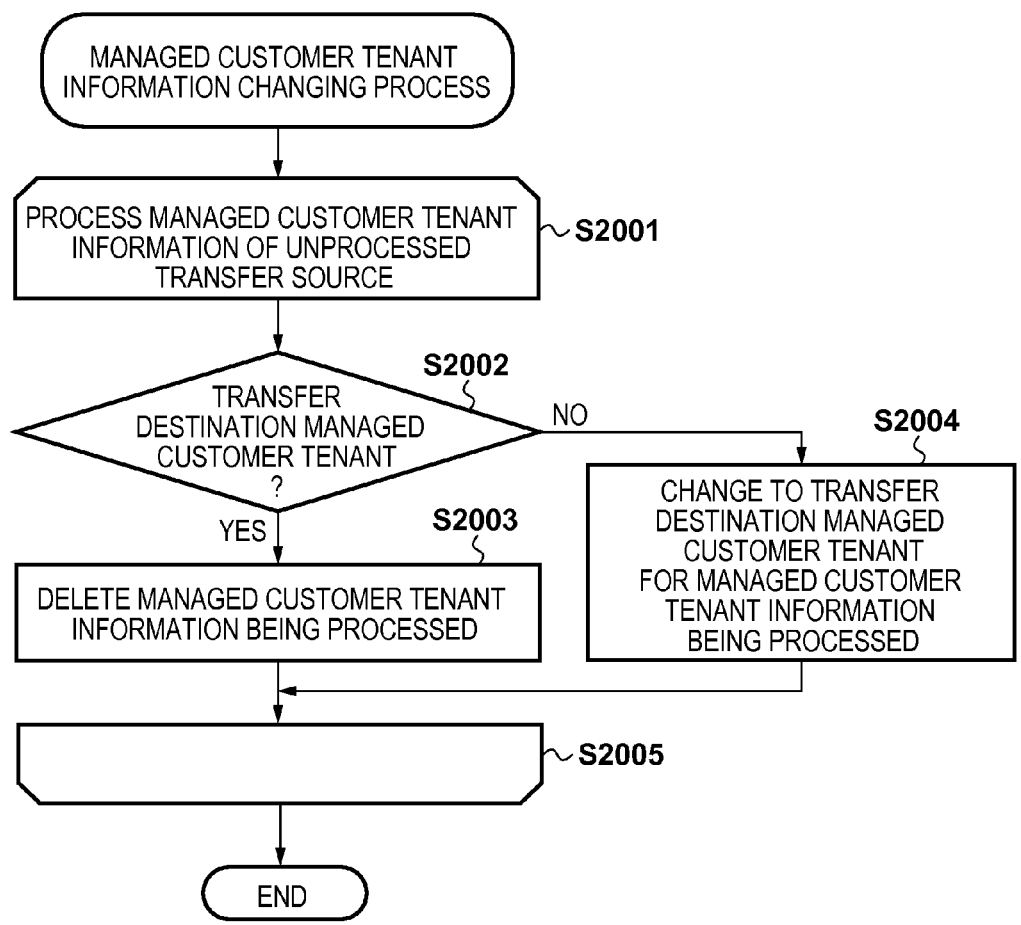
FIG. 20 is a diagram illustrating a procedure in a process indicated in S1504.

FIG. 20 is a flowchart illustrating, in detail, procedures in the process of S1504 illustrated in FIG. 15. In this process, a changing process involved in the transfer of service providers is carried out for the managed customer tenant information held in the managed customer tenant information table 700.

When the managed customer tenant information changing process starts, in S2001, the transfer processing unit 404 repeats the processes of S2001 to S2005 for each instance of the transfer source service provider managed customer tenant information obtained in S1501. Here, the managed customer tenant information to be processed is information not subject to the processing in S1601 (managed information aside from the managed information subject to processing in S1601), or in other words, is sharing information in which the transfer source service provider is neither the sharing source service provider nor the sharing destination service provider.

In S2002, the transfer processing unit 404 determines, for the managed customer tenant information to be processed, whether or not the customer tenant is a customer tenant managed by the transfer destination service provider, based on the transfer destination service provider managed customer tenant information obtained in S1502. Here, the process moves to S2003 in the case where it has been determined that the customer tenant is a customer tenant managed by the transfer destination service provider, whereas the process moves to S2004 in the case where it has been determined that the customer tenant is not a customer tenant managed by the transfer destination service provider.

In S2003, the transfer processing unit 404 deletes the managed customer tenant information being processed from the managed customer tenant information table. Meanwhile, in S2004, the transfer processing unit 404 changes the service provider tenant ID 701 to the tenant ID of the transfer destination service provider, in the managed customer tenant information being processed.

In S2005, the transfer processing unit 404 determines whether or not there is managed customer tenant information for which the processes of S2001 to S2005 have not been carried out. Here, the processing is repeated from S2001 in the case where it has been determined that there is managed customer tenant information for which the processes of S2001 to S2005 have not been carried out. On the other hand, the processing illustrated in FIG. 20 ends in the case where it has been determined that there is no managed customer tenant information for which the processes of S2001 to S2005 have not been carried out.

Customer Tenant Information Table (Post-Transfer Process)

FIG. 6B is a diagram illustrating a post-transfer process state of the customer tenant information table 600 illustrated in FIG. 6A. Here, the transfer source service provider is the service provider X (with a service provider tenant ID of S000X). Meanwhile, the transfer destination service provider is the service provider A (with a service provider tenant ID of S000A). As illustrated in FIG. 6B, in customer tenant information 604 and 605, the licensing service provider tenant ID 603 has been changed to the transfer destination service provider ID as a result of the process of S1609 in FIG. 16.

Managed Customer Tenant Information Table (Post-Transfer Process)

FIG. 7B is a diagram illustrating a post-transfer process state of the managed customer tenant information table 700 illustrated in FIG. 7A. In managed customer tenant information 703 and 704, the service provider tenant ID 701 has been changed to the transfer destination service provider ID as a result of the process of S2004 in FIG. 20. Furthermore, managed customer tenant information 705 to 708 has been deleted as a result of the process in S2003.

Sharing Information Table (Post-Transfer Process)

FIGS. 8B and 9 are diagrams illustrating a post-transfer process state of the sharing information table 800 illustrated in FIG. 8A. FIG. 8B is a diagram illustrating the post-transfer process state in the case where the setting 1306 or the setting 1402 has been selected as the post-transfer sharing state in the post-transfer sharing state settings screen. FIG. 9 is a diagram illustrating the post-transfer process state in the case where the setting 1307 or the setting 1403 has been selected as the post-transfer sharing state. FIG. 9 differs from FIGS. 8A and 8B in terms of sharing information 815.

As illustrated in FIG. 8B, in sharing information 804, the sharing destination service provider tenant ID 803 has been changed to the transfer destination service provider ID as a result of the process of S1903 in FIG. 19. In sharing information 805, the sharing source service provider tenant ID 802 has been changed to the transfer destination service provider ID as a result of the process of S1902 in FIG. 19.

Sharing information 806 has been deleted as a result of the process of S1803 in FIG. 18. In sharing information 807, the sharing source service provider tenant ID 802 has been changed to the transfer destination service provider ID as a result of the process of S1716 in FIGS. 17A and 17B. In sharing information 808, the sharing destination service provider tenant ID 803 has been changed to the transfer destination service provider ID as a result of the process of S1804 in FIG. 18.

Sharing information 809 has been deleted as a result of the process of S1702 in FIGS. 17A and 17B. In sharing information 810, the sharing source service provider tenant ID 802 has been changed to the transfer destination service provider ID as a result of the process of S1716 in FIGS. 17A and 17B.

Sharing information 811 has been deleted as a result of the process of S1803 in FIG. 18. In sharing information 812, the sharing source service provider tenant ID 802 has been changed to the transfer destination service provider ID as a result of the process of S1716 in FIGS. 17A and 17B. In sharing information 813, the sharing source service provider tenant ID 802 has been changed to the transfer destination service provider ID as a result of the process of S1705 in FIGS. 17A and 17B. Sharing information 814 has been deleted as a result of the process of S1708 in FIGS. 17A and 17B. A determination of "take over transfer source service provider tenant/own sharing destination" is made in S1710, and thus there is no change to the content of sharing information 815 in FIG. 8B. However, in FIG. 9, the sharing source service provider tenant ID 802 has been changed to the ID of the service provider C, which is located above the service provider A, as a result of the process of S1711 in FIGS. 17A and 17B.

FIG. 11 is a diagram illustrating a post-transfer customer sharing state expressed by the sharing information illustrated in FIG. 8B. FIG. 12 is a diagram illustrating the post-transfer process state in the case where the setting 1307 or the setting 1403 has been selected (that is, the transfer destination does not take over the sharing destination) as the post-transfer sharing state in the post-transfer sharing state settings screen. First, a case where the transfer destination takes over the sharing destination will be described with reference to FIG. 11.

With respect to the customer 3 indicated in FIG. 11, as illustrated in FIG. 8B, in the sharing information 804, the sharing destination service provider tenant ID 803 has been changed to the transfer destination service provider ID as a result of the process of S1903 in FIG. 19. This corresponds to the sharing destination of the service provider B being changed from the service provider X (the transfer source) to the service provider A (the transfer destination), as indicated by the sharing state for the customer 3 in FIG. 11.

As illustrated in FIG. 8B, in the sharing information 805, the sharing source service provider tenant ID 802 has been changed to the transfer destination service provider ID as a result of the process of S1902 in FIG. 19. This corresponds to the sharing source of the service provider C being changed from the service provider X (the transfer source) to the service provider A (the transfer destination), as indicated by the sharing state for the customer 3 in FIG. 11.

With respect to a customer 4 indicated in FIG. 11, as illustrated in FIG. 8B, the sharing information 806 (from A to X) has been deleted as a result of the process in S1803 of FIG. 18. This corresponds to the service provider X (the transfer source) being deleted, as indicated by the sharing state for the customer 4 in FIG. 11. Meanwhile, as illustrated in FIG. 8B, in the sharing information 807, the sharing source service provider tenant ID 802 has been changed as a result of the process of S1717 in FIGS. 17A and 17B. In FIG. 11, the transfer destination takes over the sharing destination, and thus the sharing destination of the service provider A becomes a service provider D.

With respect to a customer 5 indicated in FIG. 11, as illustrated in FIG. 8B, in the sharing information 808, the sharing destination service provider tenant ID 803 has been changed to the transfer destination service provider ID as a result of the process of S1804 in FIG. 18. This corresponds to the sharing destination of the service provider B being changed from the service provider X (the transfer source) to the service provider A (the transfer destination), as indicated by the sharing state for the customer 5 in FIG. 11. The sharing information 809 has been deleted as a result of the process of S1702, as indicated in FIG. 8B. This corresponds to the service provider X (the transfer source) being deleted, as indicated by the sharing state for the customer 5 in FIG. 11. Meanwhile, as illustrated in FIG. 8B, in the sharing information 810, the sharing source service provider tenant ID 802 has been changed to the transfer destination service provider ID as a result of the process of S1716 in FIGS. 17A and 17B. This corresponds to the sharing source of the service provider C being changed from the service provider X (the transfer source) to the service provider A (the transfer destination), as indicated by the sharing state for the customer 5 in FIG. 11. As a result, with respect to the customer 5, the service provider A shares with the service providers D and C.

With respect to a customer 6, as illustrated in FIG. 8B, the sharing information 811 has been deleted as a result of the process in S1803 of FIG. 18. This corresponds to the service provider X (the transfer source) being deleted, as indicated by the sharing state for the customer 6 in FIG. 11. Meanwhile, as illustrated in FIG. 8B, in the sharing information 812, the sharing source service provider tenant ID 802 has been changed as a result of the process of S1717 in FIGS. 17A and 17B. This corresponds to the sharing source of a service provider E being changed from the service provider X (the transfer source) to the service provider A (the transfer destination), as indicated by the sharing state for the customer 6 in FIG. 11. As a result, with respect to the customer 6, the service provider A shares with the service providers C and E.

With respect to a customer 7, as illustrated in FIG. 8B, in the sharing information 813, the sharing source service provider tenant ID 802 has been changed to the transfer destination service provider ID as a result of the process of S1705 in FIGS. 17A and 17B. This corresponds to the sharing source of the service provider C being changed from the service provider X (the transfer source) to the service provider A (the transfer destination), as indicated by the sharing state for the customer 7 in FIG. 11. As illustrated in FIG. 8B, the sharing information 814 has been deleted as a result of the process in S1708 of FIGS. 17A and 17B. In other words, the management is shared with the service provider C by the service provider A, but the service provider C also shares with the service provider A, and thus the sharing relationship from the service provider C to the service provider A is deleted. As a result, with respect to the customer 7, the service provider A shares with the service providers C and E. Meanwhile, as illustrated in FIG. 8B, in the sharing information 815, the relationship in which the service provider A shares with the service provider E does not change.

Next, a case where the transfer destination does not take over the sharing destination will be described with reference to FIG. 12, focusing on the differences from FIG. 11. The sharing state for the customer 6 in FIG. 12 differs from that in FIG. 11 in that the sharing source of the service provider E is the service provider C instead of the service provider A. In the case of FIG. 11, the service provider E that is the sharing destination of the transfer source service provider X is taken over by the transfer destination service provider A. On the other hand, in the case of FIG. 12, the service provider E, which is the sharing destination of the transfer source service provider X, is taken over by the service provider C that is located further above the transfer destination service provider A in the sharing relationship, and thus the sharing state is as illustrated in FIG. 12.

The sharing state for the customer 7 in FIG. 12 differs from that in FIG. 11 in that the sharing source of the service provider E is the service provider C instead of the service provider A. In the case of FIG. 11, sharing relationships lower than the transfer source service provider X in FIG. 10 are taken over by the transfer destination service provider A. On the other hand, in the case of FIG. 12, the service provider E, which is the sharing destination of the transfer destination service provider A, is taken over by the service provider C that is located further above the transfer destination service provider A in the sharing relationship, and thus the sharing state is as illustrated in FIG. 12.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-084965, filed Apr. 16, 2014, which is hereby incorporated by reference herein in its entirety.

What is claimed is:
1. A managing system that manages management information using a plurality of tenants that form a hierarchical structure, the system comprising:
one or more processors; and
a memory coupled to the one or more processors, the memory having instructions stored thereon which, when executed by the one or more processors, cause the managing system to:
designate a first tenant, of the plurality of tenants, that manages management information to be transferred between tenants,
designate a second tenant to serve as a transfer destination for the management information that is to be transferred from the designated first tenant,
specify second management information, of the management information managed by the first tenant, that is shared with another tenant, in accordance with a sharing relationship for the second management information,
transfer third management information, of the management information managed by the first tenant, except for the specified second management information, to the second tenant, and
change the sharing relationship for the specified second management information to a sharing relationship in which the second management information is shared between the second tenant and a tenant in a level above or below the second tenant in accordance with a new hierarchical structure formed after the transfer,
wherein the specified second management information is transferred to the second tenant by changing the sharing relationship for the specified second management information to the sharing relationship in which the second management information is shared between the second tenant and the tenant in the level above or below the second tenant in accordance with the new hierarchical structure formed after the transfer.

2. The managing system according to claim 1, wherein the instructions, when executed by the one or more processors, further cause the managing system to:
select whether or not to apply the sharing relationship based on the hierarchical structure for the first tenant to the second tenant when the transfer is carried out,
wherein the sharing relationship for the specified second management information is changed to the sharing relationship in which the second management information is shared between the second tenant and the tenant in the level above or below the second tenant in accordance with the new hierarchical structure formed in response to the selection.

3. The managing system according to claim 2, wherein in a case where the sharing relationship based on the hierarchical structure for the first tenant to the second tenant is selected to be applied, and in a case where the second tenant is located above the first tenant prior to the transfer a sharing relationship below the first tenant is applied to the post-transfer second tenant.

4. The managing system according to claim 3, wherein in a case where the second tenant is located below the first tenant prior to the transfer a sharing relationship above the first tenant is applied to the sharing relationship above the post-transfer second tenant.

5. The managing system according to claim 1, wherein the instructions, when executed by the one or more processors, further cause the managing system to:
accept a setting of the new hierarchical structure formed after the transfer,
wherein the sharing relationship for the specified second management information is changed to the sharing relationship in which the second management information is shared between the second tenant and the tenant in the level above or below the second tenant in accordance with the new hierarchical structure formed in response to the accepted setting accepted.

6. The managing system according to claim 1, wherein the plurality of tenants manage management information used by a plurality of service providers that provide a service to a customer; and
wherein the management information includes customer information for the customer.

7. A managing method executed by a managing system that manages management information using a plurality of tenants that form a hierarchical structure, the method comprising:
designating a first tenant, of the plurality of tenants, that manages management information to be transferred between tenants;
designating a second tenant to serve as a transfer destination for the management information that is to be transferred from the designated first tenant;
specifying second management information, of the management information managed by the first tenant, that is shared with another tenant, in accordance with a sharing relationship for the second management information;
transferring third management information, of the management information managed by the first tenant, except for the specified second management information, to the second tenant; and
charging the sharing relationship for the specified second management information to a sharing relationship in which the second management information is shared between the second tenant and a tenant in a level above or below the second tenant in accordance with a new hierarchical structure formed after the transfer,
wherein the specified second management information is transferred to the second tenant by changing the sharing relationship for the specified second management information to the sharing relationship in which the second management information is shared between the second tenant and the tenant in the level above or below the second tenant in accordance with the new hierarchical structure formed after the transfer.

* * * * *